(12) United States Patent
Yasuda et al.

(10) Patent No.: US 11,560,052 B2
(45) Date of Patent: Jan. 24, 2023

(54) MULTIPURPOSE VEHICLE

(71) Applicant: Kubota Corporation, Osaka (JP)

(72) Inventors: Toshifumi Yasuda, Sakai (JP); Takashi Kuramoto, Sakai (JP); Kensuke Okabe, Sakai (JP); Hiroshi Takagi, Sakai (JP)

(73) Assignee: Kubota Corporation, Osaka (JP)

( * ) Notice: Subject to any disclaimer, the term of this patent is extended or adjusted under 35 U.S.C. 154(b) by 242 days.

(21) Appl. No.: 16/896,427

(22) Filed: Jun. 9, 2020

(65) Prior Publication Data

US 2021/0170865 A1 Jun. 10, 2021

(30) Foreign Application Priority Data

Dec. 4, 2019 (JP) .............................. JP2019-219552

(51) Int. Cl.
*B60K 17/08* (2006.01)
*B60K 5/04* (2006.01)
*B60K 17/10* (2006.01)
*F16H 57/02* (2012.01)

(52) U.S. Cl.
CPC ................ *B60K 17/08* (2013.01); *B60K 5/04* (2013.01); *B60K 17/10* (2013.01); *F16H 57/02* (2013.01); *F16H 2057/02013* (2013.01)

(58) Field of Classification Search
CPC .......... B60K 17/08; B60K 5/04; B60K 17/10; F16H 57/02; F16H 2057/02013
See application file for complete search history.

(56) References Cited

U.S. PATENT DOCUMENTS

| 4,702,725 A | * | 10/1987 | Kouno | ............. | F16H 61/66259 |
| | | | | | 474/18 |
| 6,848,530 B2 | * | 2/2005 | Tani | ....................... | B60K 17/10 |
| | | | | | 180/374 |
| 8,439,141 B2 | | 5/2013 | Bessho et al. | | |
| 8,459,397 B2 | | 6/2013 | Bessho et al. | | |
| 9,840,141 B2 | * | 12/2017 | Ooki | ..................... | F16H 57/021 |
| 2005/0126842 A1 | * | 6/2005 | Rasidescu | ............. | B62M 27/02 |
| | | | | | 180/291 |
| 2006/0084548 A1 | * | 4/2006 | Abiru | ..................... | B60K 17/08 |
| | | | | | 475/200 |

(Continued)

FOREIGN PATENT DOCUMENTS

| JP | 201251506 A | 3/2012 |
| JP | 201713687 A | 1/2017 |
| WO | 2011111544 A1 | 9/2011 |

*Primary Examiner* — Frank B Vanaman
(74) *Attorney, Agent, or Firm* — The Webb Law Firm

(57) ABSTRACT

A multipurpose vehicle includes an engine, a travel transmission device, a continuously variable transmission device, and a spacer housing capable of becoming attached to and detached from the engine, the continuously variable transmission device, and the travel transmission device. The spacer housing contains an engine output shaft, a transmission device input shaft of the continuously variable transmission device, a first connecting portion connecting the engine output shaft with the transmission device input shaft in an interlocking manner, a transmission device output shaft of the continuously variable transmission device, a transmission input shaft of the travel transmission device, and a second connecting portion connecting the transmission device output shaft with the transmission input shaft in an interlocking manner.

5 Claims, 6 Drawing Sheets

(56) References Cited

U.S. PATENT DOCUMENTS

| | | | |
|---|---|---|---|
| 2008/0182699 A1* | 7/2008 | Salvaire | F04B 17/05 |
| | | | 166/305.1 |
| 2012/0055729 A1 | 3/2012 | Bessho et al. | |
| 2012/0217116 A1* | 8/2012 | Nishimoto | B60K 17/344 |
| | | | 192/56.6 |
| 2013/0075183 A1* | 3/2013 | Kochidomari | B60K 17/043 |
| | | | 477/3 |
| 2017/0001549 A1 | 1/2017 | Bessho et al. | |

* cited by examiner

MULTIPURPOSE VEHICLE

CROSS-REFERENCE TO RELATED APPLICATION

This claims priority to Japanese Patent Application No. 2019-219552 filed Dec. 4, 2019, the disclosure of which is hereby incorporated by reference in its entirety.

TECHNICAL FIELD

The present invention relates to a multipurpose vehicle.

BACKGROUND ART

Some multipurpose vehicles include an engine, a travel transmission device provided on one side of the engine in the front-rear direction of the vehicle body, and a continuously variable transmission device provided on one side of the engine and the travel transmission device in a width direction of the vehicle body, the continuously variable transmission device being configured to vary an output of the engine non-stepwise and then transmit the output to the travel transmission device.

This type of multipurpose vehicle is disclosed in, for example, JP 2012-51506 A. JP 2012-51506 A discloses a multipurpose vehicle including a transmission case provided rearward of the engine and serving as the travel transmission device and a belt-type continuously variable transmission device as the continuously variable transmission device.

Some multipurpose vehicles of this type are configured such that the continuously variable transmission device includes a transmission device input shaft connected directly with an engine output shaft of the engine and a transmission device output shaft connected directly with a transmission input shaft of the travel transmission device. In this case, to use continuously variable transmission devices with different specifications such as different output values and/or transmission modes to produce multipurpose vehicles with different specifications, it is necessary to prepare continuously variable transmission devices each including a transmission device input shaft and a transmission device output shaft with an axial gap therebetween adjusted to be equal to the axial gap between the engine output shaft of the engine and the transmission input shaft of the travel transmission device. As a result, the preparation of continuously variable transmission devices requires a high cost.

This has led to a demand for a multipurpose vehicle that can be produced inexpensively even in the case of using continuously variable transmission devices with different specifications. The present disclosure thus proposes a multipurpose vehicle configured as below.

SUMMARY OF INVENTION

A multipurpose vehicle, comprising:
an engine;
a travel transmission device provided on one side of the engine in a front-rear direction of a vehicle body;
a continuously variable transmission device provided on one side of the engine and the travel transmission device in a width direction of the vehicle body, the continuously variable transmission device being configured to vary an output of the engine non-stepwise and then transmit the output to the travel transmission device; and
a spacer housing capable of becoming attached to and detached from the engine, the continuously variable transmission device, and the travel transmission device, the spacer housing having a first end in a front-rear direction which first end is positioned between the engine and the continuously variable transmission device and a second end in the front-rear direction which second end is positioned between the travel transmission device and the continuously variable transmission device,
wherein the spacer housing contains (i) an engine output shaft of the engine, (ii) a transmission device input shaft of the continuously variable transmission device, (iii) a first connecting portion connecting the engine output shaft with the transmission device input shaft in an interlocking manner, (iv) a transmission device output shaft of the continuously variable transmission device, (v) a transmission input shaft of the travel transmission device, and (vi) a second connecting portion connecting the transmission device output shaft with the transmission input shaft in an interlocking manner.

With the above configuration, even if a continuously variable transmission device to be used includes a transmission device input shaft and a transmission device output shaft with an axial gap therebetween different from the axial gap between the engine output shaft and the transmission input shaft, the first connecting portion and/or the second connecting portion in the spacer housing can be set to absorb the difference between the axial gaps, so that power of the engine output shaft is transmitted to the transmission device input shaft and that power of the transmission device output shaft is transmitted to the transmission input shaft. With this configuration, producing a spacer housing containing the first connecting portion and the second connecting portion is less expensive than producing a customized continuously variable transmission device including a transmission device input shaft and a transmission device output shaft with an axial gap therebetween adjusted to be equal to the axial gap between the engine output shaft and the transmission input shaft. This makes it possible to produce a multipurpose vehicle inexpensively even in the case of using continuously variable transmission devices with different specifications.

A preferable embodiment is configured such that the second connecting portion includes:
an output gear incapable of rotation relative to the transmission device output shaft;
an input gear incapable of rotation relative to the transmission input shaft; and
a relay gear engaged with the output gear and the input gear.

The above configuration allows power from the transmission device output shaft to be inputted efficiently into the travel transmission device, thereby allowing the multipurpose vehicle to travel with high fuel efficiency.

A preferable embodiment is configured such that the first connecting portion includes:
a gear-type transmission mechanism connecting the engine output shaft and the transmission device input shaft with each other and configured to transmit power of the engine output shaft to the transmission device input shaft.

The above configuration allows power from the engine output shaft to be inputted efficiently into the transmission device, thereby allowing the multipurpose vehicle to travel with high fuel efficiency.

A preferable embodiment is configured such that the spacer housing is provided with a hydraulic valve.

The above configuration allows a hydraulic valve to be supported by a simple supporting structure involving the spacer housing as a supporting member of the hydraulic valve.

For a preferable embodiment, the multipurpose vehicle further comprises:

a truck box provided at a rear portion of the vehicle body and capable of being swung vertically; and a hydraulic cylinder connected with the truck box and configured to swing the truck box, wherein the hydraulic valve is provided at a rear portion of the spacer housing in such a manner as to be capable of operating the hydraulic cylinder.

With the above configuration, the hydraulic valve is close to the hydraulic cylinder. This allows the hydraulic valve and the hydraulic cylinder to be connected with each other through a short operation oil passage.

A preferable embodiment is configured such that the continuously variable transmission device is a continuously variable transmission device of a hydraulic type, and while the spacer housing is detached, an input shaft of a belt-type continuously variable transmission device as a replacement of the continuously variable transmission device of the hydraulic type is connectable with the engine output shaft, and an output shaft of the belt-type continuously variable transmission device is connectable with the transmission input shaft.

The above configuration allows a specification change from (i) a transmission specification with which a continuously variable transmission device of a hydraulic type is used to vary the traveling speed to (ii) a transmission specification with which a belt-type continuously variable transmission device is used to vary the traveling speed.

DESCRIPTION OF EMBODIMENTS

The description below deals with an example embodiment of the present invention with reference to drawings.

Figure 1:
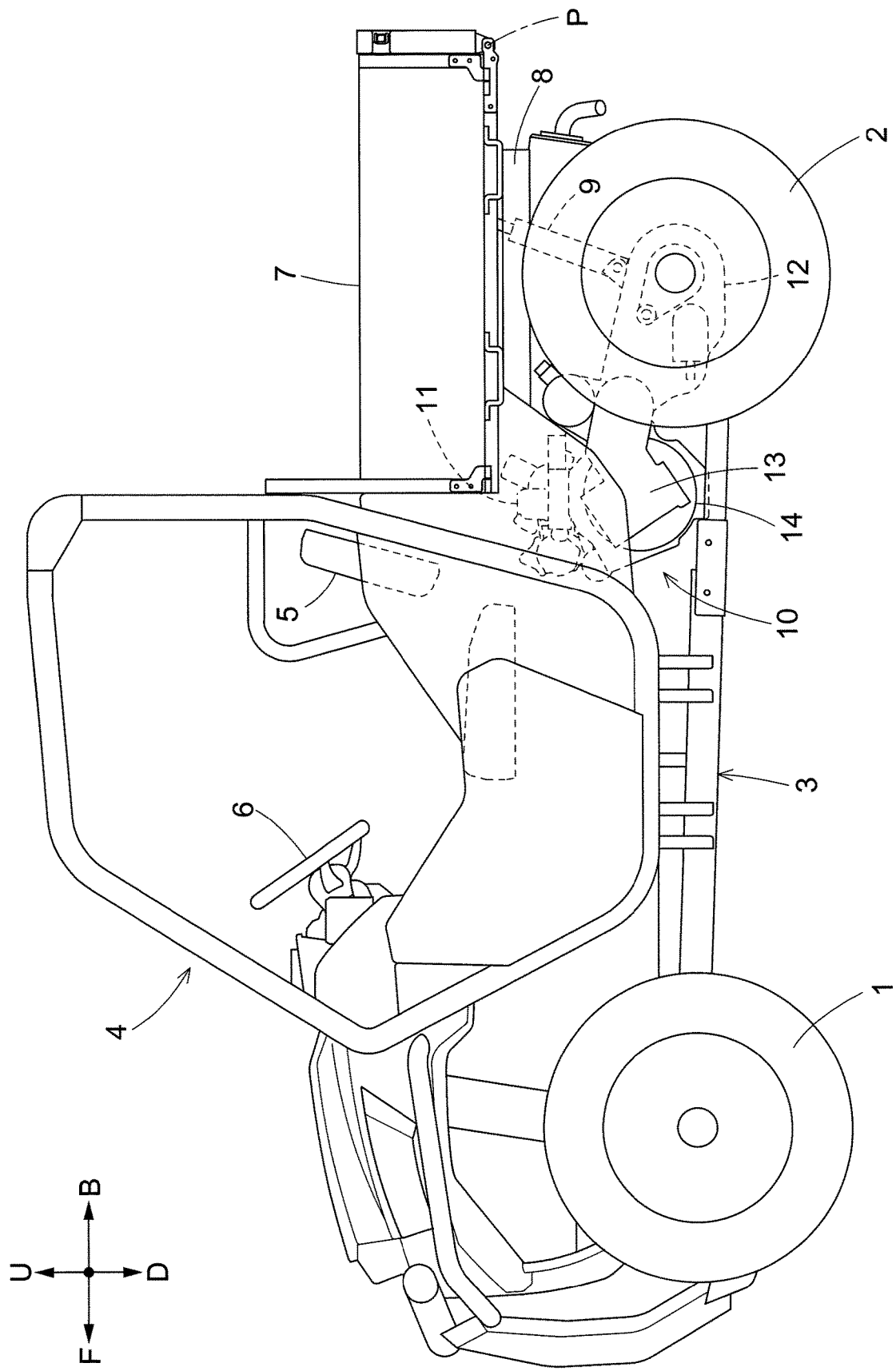
FIG. 1 is a left side view of a multipurpose vehicle as a whole.
Figure 2:
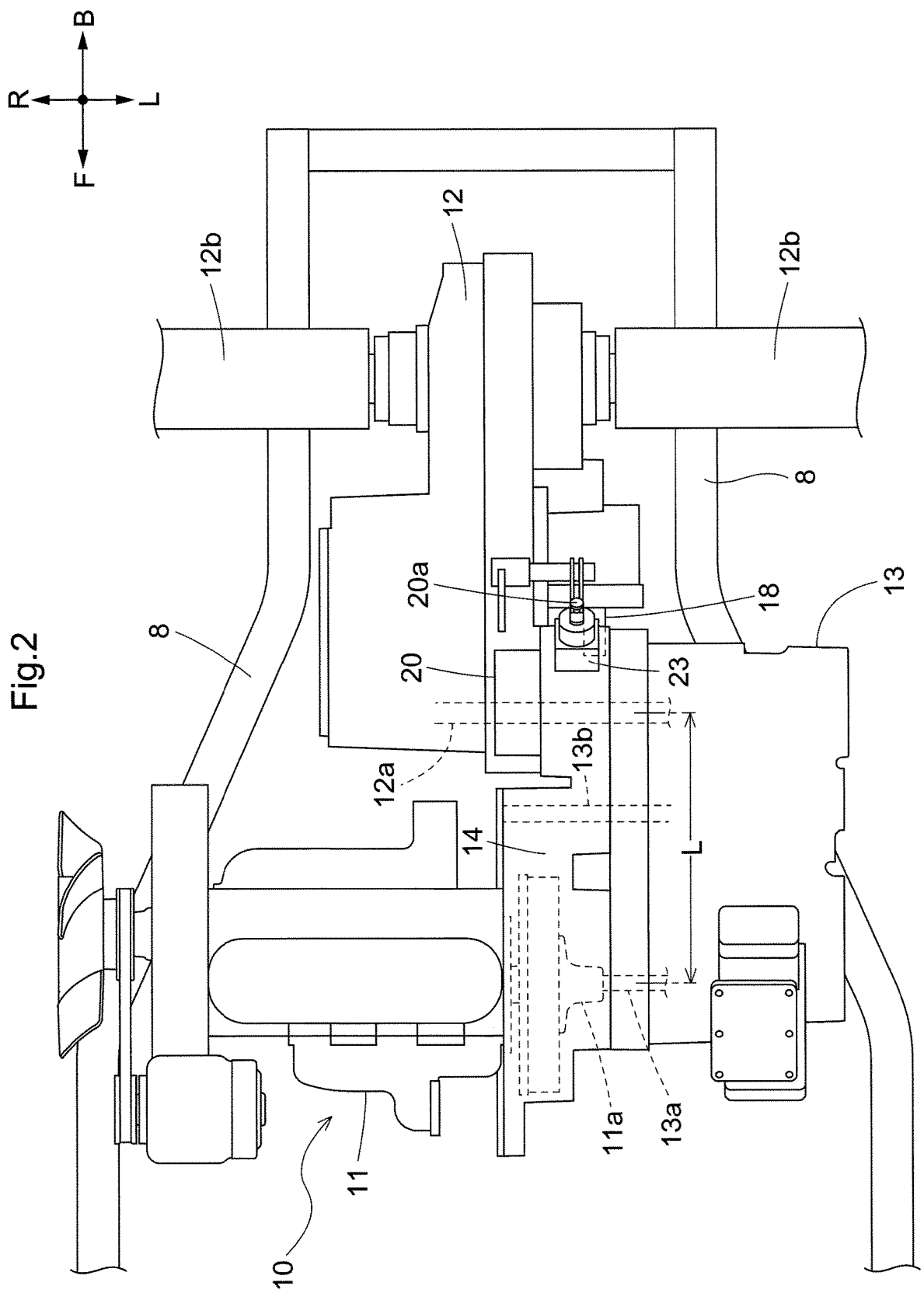
FIG. 2 is a plan view of a motor part.

In the description below, regarding a travel vehicle body of a multipurpose vehicle, FIGS. 1 and 2 show an arrow F to indicate the forward direction of the vehicle body, an arrow B to indicate the backward direction of the vehicle body, an arrow U to indicate the upward direction of the vehicle body (see FIG. 1), an arrow D to indicate the downward direction of the vehicle body (see FIG. 1), an arrow L to indicate the leftward direction of the vehicle body (see FIG. 2), and an arrow R to indicate the rightward direction of the vehicle body (see FIG. 2).

[Overall Configuration of Multipurpose Vehicle]

As illustrated in FIG. 1, the multipurpose vehicle includes a travel vehicle body 3. The travel vehicle body 3 is provided with a pair of left and right, steerable and drivable front wheels 1 and a pair of left and right, drivable rear wheels 2. The multipurpose vehicle includes a driving part 4 at an intermediate portion of the travel vehicle body 3 in the front-rear direction. The driving part 4 includes a driver's seat 5 and a steering wheel 6 for steering the front wheels 1. The travel vehicle body 3 has a rear portion provided with a truck box 7. The multipurpose vehicle includes below the truck box 7 a motor part 10 configured to output a driving force for the front wheels 1 and a driving force for the rear wheels 2.

[Configuration of Truck Box]

The truck box 7 is, as illustrated in FIG. 1, supported by a body frame 8 in such a manner as to be vertically swingable about a dump axis P as a swing fulcrum located at a rear portion of the truck box 7. The truck box 7 is configured to be swung in response to extension and contraction of a hydraulic cylinder 9 connected with a lower surface of the truck box 7.

[Configuration of Motor Part]

As illustrated in FIGS. 1 and 2, the motor part 10 includes an engine 11, a travel transmission device 12, a continuously variable transmission device 13, and a spacer housing 14. The engine 11 is provided at a front portion of a space below the truck box 7. The travel transmission device 12 is a transmission device for travel, and is provided on that side of the engine 11 which is in a rear direction of the vehicle body. The continuously variable transmission device 13 is provided on that side of the engine 11 and the travel transmission device 12 which is in a left direction of the vehicle body. The continuously variable transmission device 13 for the present embodiment is a continuously variable transmission device of a hydrostatic type. The spacer housing 14 has a front end ("first end in a front-rear direction") between the engine 11 and the continuously variable transmission device 13. The spacer housing 14 has a rear end ("second end in the front-rear direction") between the continuously variable transmission device 13 and the travel transmission device 12.

The spacer housing 14 is capable of becoming attached to and detached from each of the engine 11, the continuously variable transmission device 13, and the travel transmission device 12. Specifically, the spacer housing 14 has a front portion connected with use of a connecting bolt to each of (i) that side portion of the engine 11 which faces the continuously variable transmission device 13 (that is, a side portion of the engine 11 on the left side of the vehicle body) and (ii) that side portion of the continuously variable transmission device 13 which faces the engine 11 (that is, a side portion of the continuously variable transmission device 13 on the right side of the vehicle body). Further, the spacer housing 14 has a rear portion connected with use of a connecting bolt to that side portion of the travel transmission device 12 which is on the left side of the vehicle body.

Figure 3:
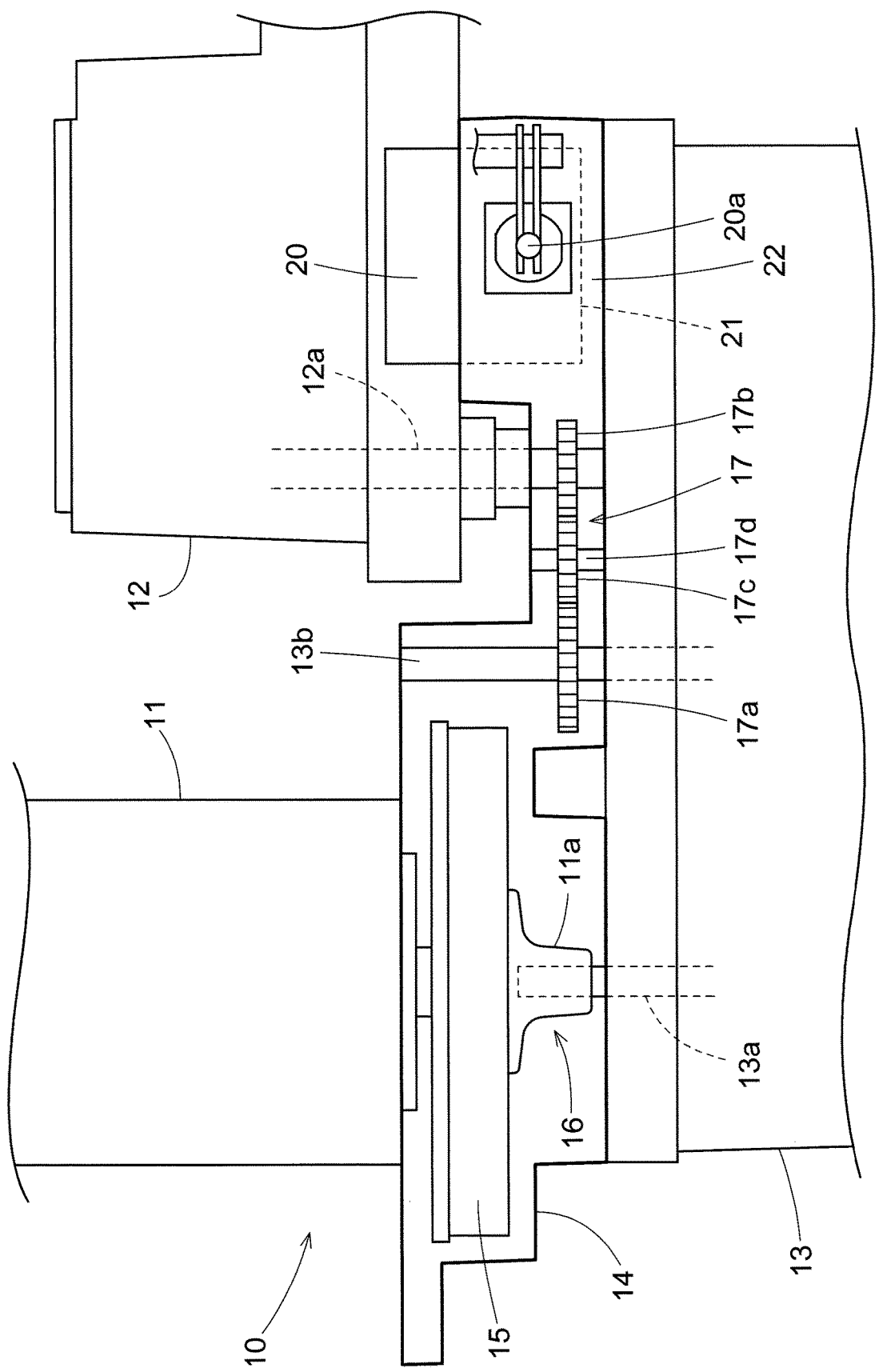
FIG. 3 is a development of a structure for connecting an engine with a continuously variable transmission device, a structure for connecting the continuously variable transmission device with a travel transmission device, and a spacer housing.

The engine 11 includes a crankshaft (not shown in the drawings) extending in the width direction of the vehicle body. As illustrated in FIGS. 2 and 3, the engine 11 includes an engine output shaft 11a that protrudes from a flywheel 15 of the engine 11 toward the continuously variable transmission device 13 and that is present inside the spacer housing 14. The engine 11 for the present embodiment is a diesel engine, but may alternatively be a gasoline engine.

As illustrated in FIGS. 2 and 3, the continuously variable transmission device 13 includes a transmission device input shaft 13a that protrudes from a side portion of the continuously variable transmission device 13 on the side of the engine 11 toward the engine 11 and that is present inside the spacer housing 14. The transmission device input shaft 13a and the engine output shaft 11a are connected with each other by a first connecting portion 16 in an interlocking manner. The first connecting portion 16 for the present embodiment is made up of a spline hole in the engine output shaft 11a and a spline shaft on the transmission device input shaft 13a that is capable of becoming fit in the spline hole. The first connecting portion 16 is present inside the spacer housing 14.

Figure 4:
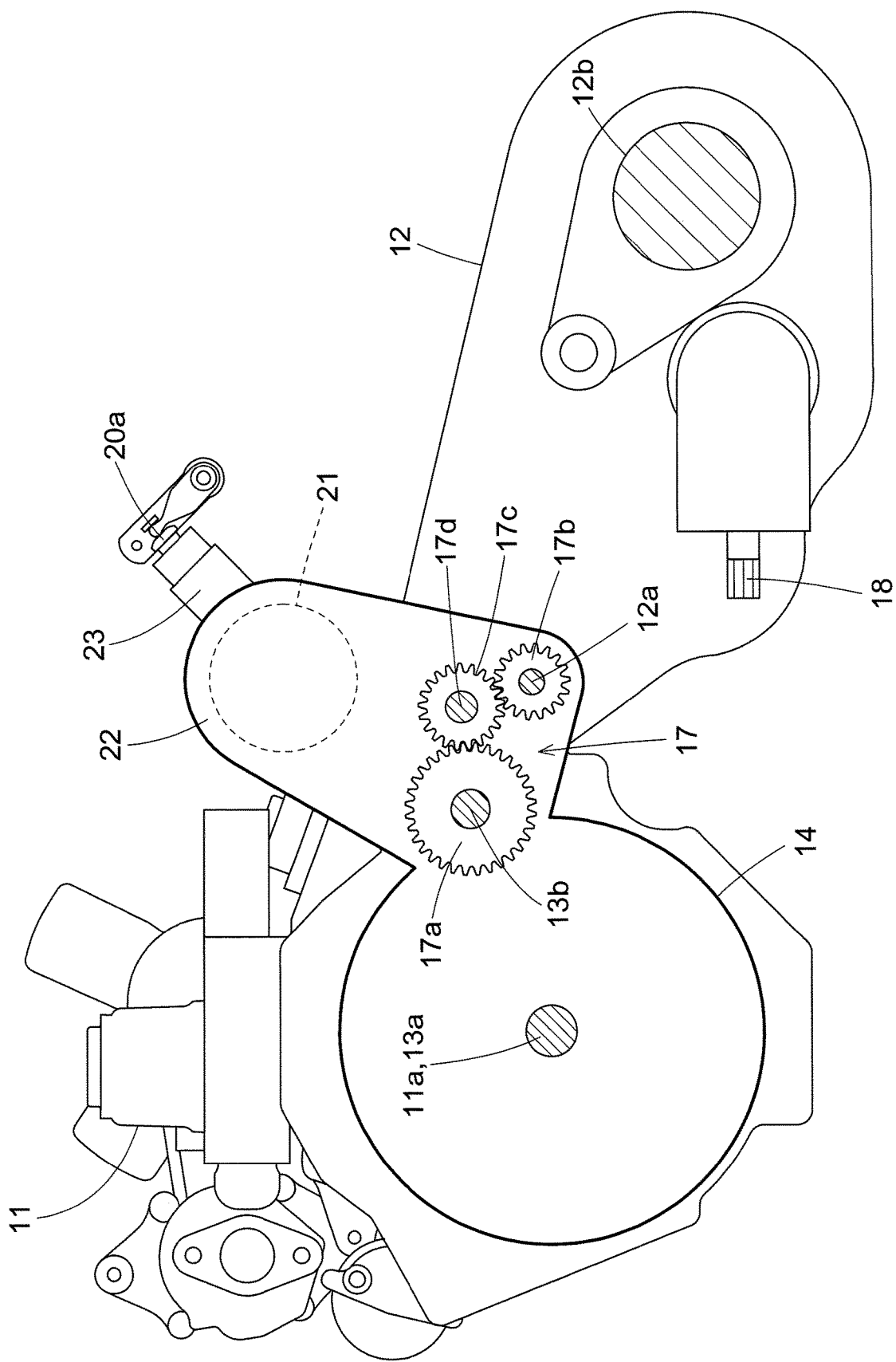
FIG. 4 provides a vertical cross-sectional view of a spacer housing.

As illustrated in FIGS. 2 and 3, the continuously variable transmission device 13 includes a transmission device output shaft 13b that protrudes from a side portion of the continuously variable transmission device 13 on the side of the engine 11 toward the spacer housing 14 and that is present inside the spacer housing 14. The travel transmission device 12 includes a transmission input shaft 12a that protrudes from a side portion of the travel transmission device 12 on the side of the continuously variable transmission device 13 toward the spacer housing 14 and that is present inside the spacer housing 14. The transmission device output shaft 13b and the transmission input shaft 12a are connected with each other by a second connecting portion 17 in an interlocking manner. The second connecting portion 17 is, as illustrated in FIGS. 3 and 4, present inside the spacer housing 14. The second connecting portion 17 for the present embodiment includes an output gear 17a incapable of rotation relative to the transmission device output shaft 13b, an input gear 17b incapable of rotation relative to the transmission input shaft 12a, and a relay gear 17c engaged with the input gear 17b and the output gear 17a. The relay gear 17c is on a shaft 17d supported by the spacer housing 14.

The motor part 10 functions as follows: Power of the engine output shaft 11a of the engine 11 is transmitted via the first connecting portion 16 to the transmission device input shaft 13a, so that the power is received by the continuously variable transmission device 13. The power received by the continuously variable transmission device 13 is then converted into a forward travel power or a rearward travel power and also varied non-stepwise by the continuously variable transmission device 13. The power varied by the continuously variable transmission device 13 is then transmitted from the transmission device output shaft 13b via the second connecting portion 17 to the transmission input shaft 12a, so that the power is received by the travel transmission device 12. The power received by the travel transmission device 12 is finally outputted from (i) rear-wheel output portions 12b (see FIG. 2) on the opposite lateral sides of a rear end portion of the travel transmission device 12 to the rear wheels 2 or from (ii) a front-wheel output shaft 18 (see FIG. 4) on a lateral side of a lower portion of the travel transmission device 12 to the front wheels 1.

As illustrated in FIG. 2, the spacer housing 14 is provided with a hydraulic valve 20 attached thereto. Specifically, as illustrated in FIGS. 3 and 4, the spacer housing 14 includes at a rear portion thereof a valve support 22 having a valve compartment 21. The hydraulic valve 20 is supported by the valve support 22 while partially present inside the valve compartment 21. The valve compartment 21 has a wall portion provided with a guide cylinder 23 protruding upward from the wall portion. The hydraulic valve 20 includes an operation portion 20a that is slidably supported by the guide cylinder 23. The hydraulic valve 20 is connected with the hydraulic cylinder 9 through a hydraulic hose (not shown in the drawings). Extending and contracting the hydraulic cylinder 9 causes the truck box 7 to be lifted and lowered.

Figure 5:
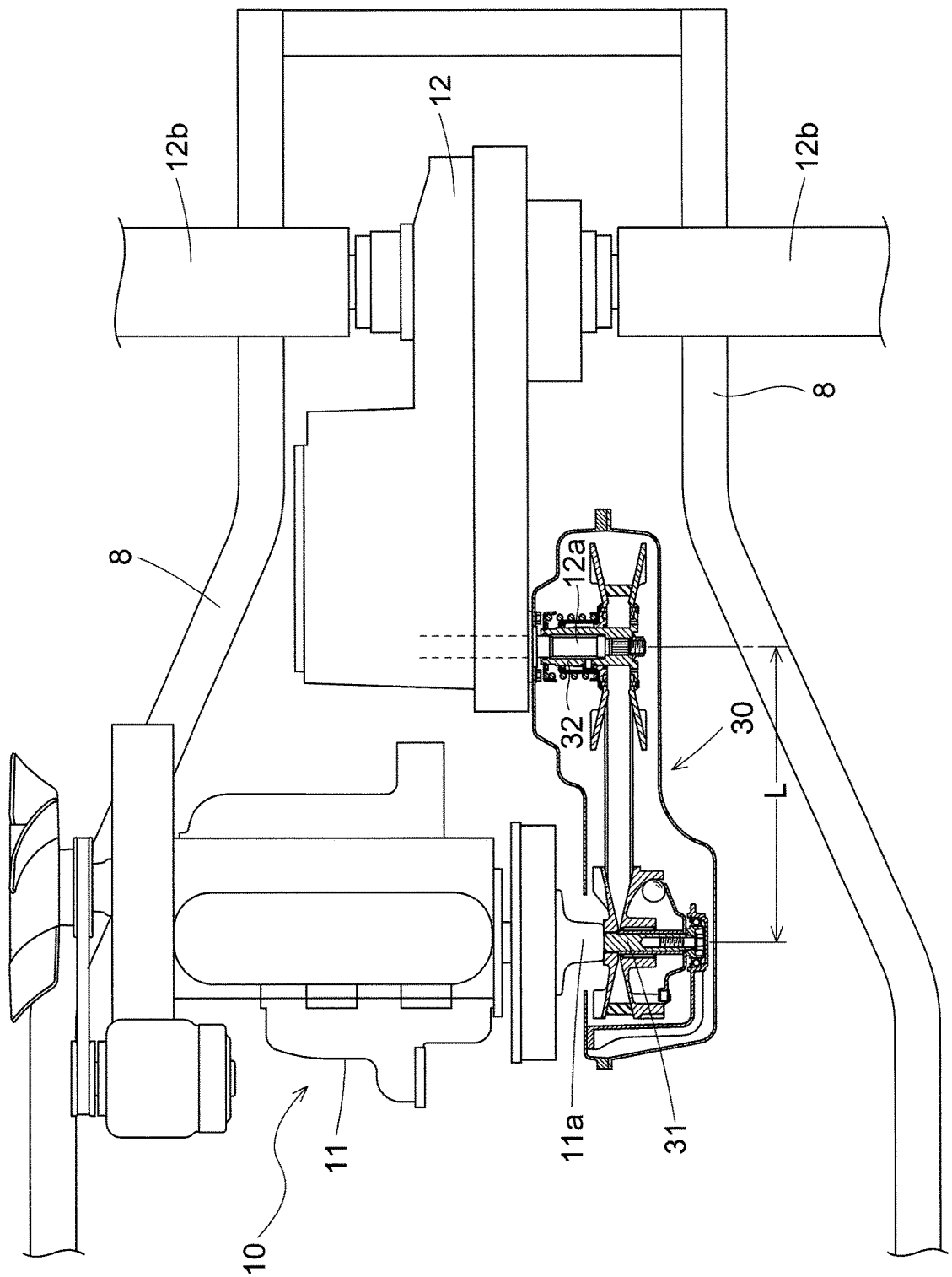
FIG. 5 is a plan view of a motor part including a belt-type continuously variable transmission device.

As illustrated in FIG. 5, the spacer housing 14 can be detached for replacement of the continuously variable transmission device 13 with a belt-type continuously variable transmission device 30.

Specifically, the engine 11 and the travel transmission device 12 are supported by the body frame 8 in such a manner that as illustrated in FIGS. 2 and 5, the engine output shaft 11a and the transmission input shaft 12a have respective axes apart from each other by an axial gap L. The belt-type continuously variable transmission device 30 has an input shaft 31 and an output shaft 32 that have respective axes also apart from each other by an axial gap L equal to the above axial gap L for the engine 11 and the travel transmission device 12. With the spacer housing 14 detached, the belt-type continuously variable transmission device 30 can be placed in such a manner that the input shaft 31 is positioned coaxially with the engine output shaft 11a and connected with the engine output shaft 11a in an interlocking manner, whereas the output shaft 32 is positioned coaxially with the transmission input shaft 12a and connected with the transmission input shaft 12a in an interlocking manner.

The present invention is applicable to a multipurpose vehicle including a travel transmission device provided on one side of the engine in the front-rear direction of the vehicle body and a continuously variable transmission device provided on one side of the engine and the travel transmission device in a width direction of the vehicle body, the continuously variable transmission device being configured to vary an output of the engine non-stepwise and then transmit the output to the travel transmission device.

OTHER EMBODIMENTS (1) The embodiment described above is an example in which a continuously variable transmission device 13 of a hydrostatic type is employed as the continuously variable transmission device for the present invention and in which a spacer housing 14 is provided. The embodiment may be varied such that a belt-type transmission device is employed as the continuously variable transmission device for the present invention and that a spacer housing 14 is provided.

(2) The embodiment described above as an example uses only the second connecting portion 17 out of the first connecting portion 16 and the second connecting portion 17 to adjust the gap for absorbing the difference between (i) the axial gap between the engine output shaft 11a and the transmission input shaft 12a and (ii) the axial gap between the transmission device input shaft 13a and the transmission device output shaft 13b. The present invention is, however, not limited to such a configuration.

Figure 6:
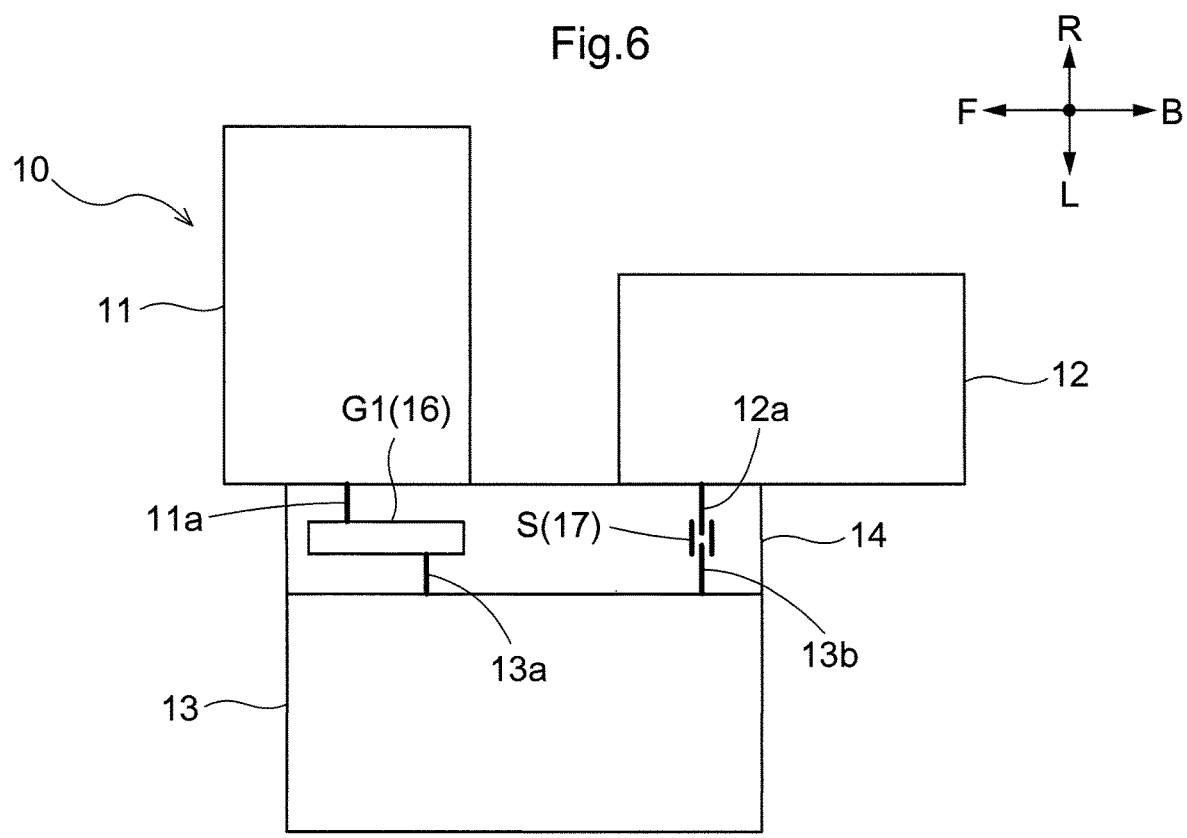
FIG. 6 is a plan view of a motor part according to a first other embodiment.

For instance, the present invention may be varied as illustrated in FIG. 6 such that the first connecting portion 16 includes a gear-type transmission mechanism G1 connecting the engine output shaft 11a and the transmission device input shaft 13a with each other to transmit power of the engine output shaft 11a to the transmission device input shaft 13a and that the second connecting portion 17 involves a spline engagement S for connecting the transmission device output shaft 13b with the transmission input shaft 12a in an interlocking manner, so that only the first connecting portion 16 is used to adjust the above gap.

Figure 7:
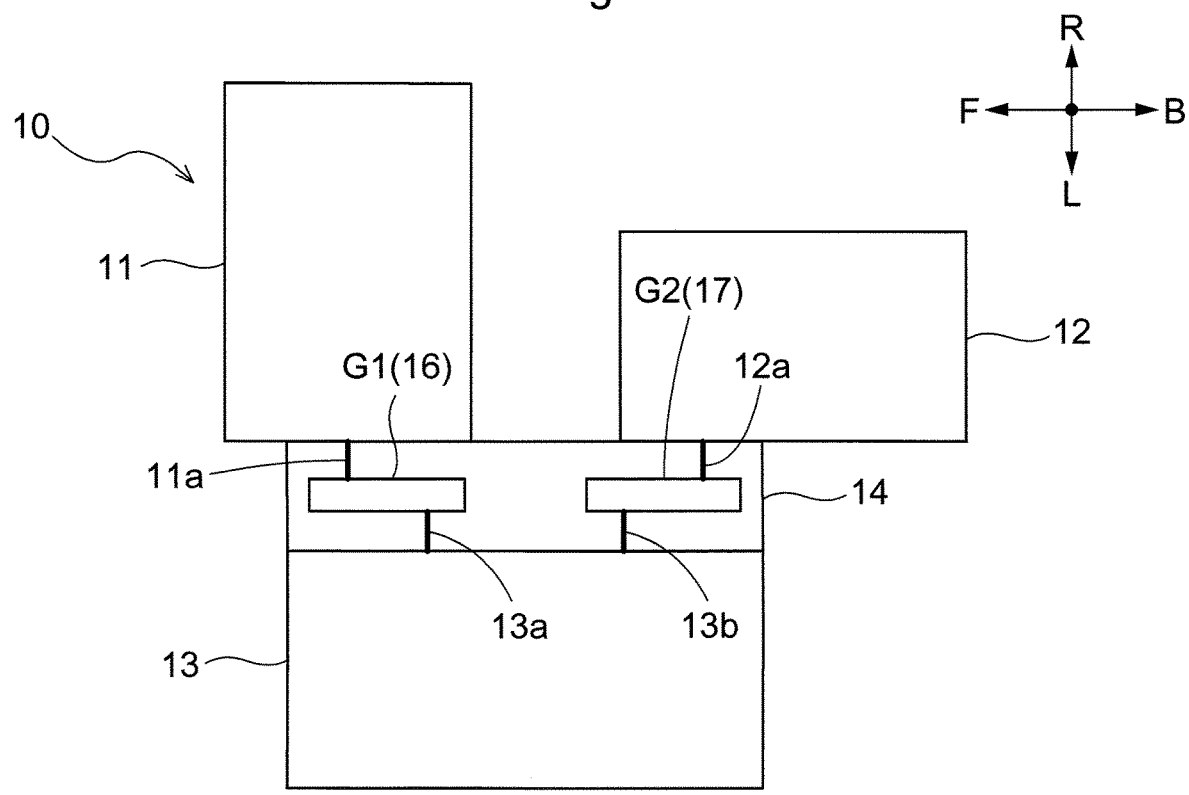
FIG. 7 is a plan view of a motor part according to a second other embodiment.

The present invention may be varied as illustrated in FIG. 7 such that the first connecting portion 16 includes a gear-type transmission mechanism G1 and that the second connecting portion 17 includes a gear-type transmission mechanism G2 connecting the transmission device output shaft 13b and the transmission input shaft 12a with each other to transmit power of the transmission device output shaft 13b to the transmission input shaft 12a, so that both the first connecting portion 16 and the second connecting portion 17 are used to adjust the above gap.

(3) The embodiment described above as an example includes a travel transmission device 12 provided on that side of the engine 11 which is in a rear direction of the vehicle body. The travel transmission device 12 may, however, alternatively be provided on that side of the engine 11 which is in a front direction of the vehicle body.

(4) The embodiment described above as an example includes a continuously variable transmission device 13 provided on that side of the engine 11 and the travel transmission device 12 which is in a left direction of the vehicle body. The continuously variable transmission device 13 may, however, alternatively be provided on that side of the engine 11 and the travel transmission device 12 which is in a right direction of the vehicle body.

(5) The embodiment described above as an example includes a hydraulic valve 20 attached to the spacer housing 14. The hydraulic valve 20 may, however, be unattached to the spacer housing 14.

The invention claimed is:

1. A multipurpose vehicle, comprising:
   an engine;
   a travel transmission device provided on one side of the engine in a front-rear direction of a vehicle body;
   a continuously variable transmission device provided on one side of the engine and the travel transmission device in a width direction of the vehicle body, the continuously variable transmission device being configured to vary an output of the engine non-stepwise and then transmit the output to the travel transmission device; and
   a spacer housing capable of becoming attached to and detached from the engine, the continuously variable transmission device, and the travel transmission device, the spacer housing having a first end in a front-rear direction which first end is positioned between the engine and the continuously variable transmission device and a second end in the front-rear direction which second end is positioned between the travel transmission device and the continuously variable transmission device,
   wherein the spacer housing contains (i) an engine output shaft of the engine, (ii) a transmission device input shaft of the continuously variable transmission device, (iii) a first connecting portion connecting the engine output shaft with the transmission device input shaft in an interlocking manner, (iv) a transmission device output shaft of the continuously variable transmission device, (v) a transmission input shaft of the travel transmission device, and (vi) a second connecting portion connecting the transmission device output shaft with the transmission input shaft in an interlocking manner, and
   wherein the spacer housing is provided with a hydraulic valve.

2. The multipurpose vehicle according to claim 1, wherein the second connecting portion includes:
   an output gear incapable of rotation relative to the transmission device output shaft;
   an input gear incapable of rotation relative to the transmission input shaft; and
   a relay gear engaged with the output gear and the input gear.

3. The multipurpose vehicle according to claim 1, wherein the first connecting portion includes: a gear transmission mechanism connecting the engine output shaft and the transmission device input shaft with each other and configured to transmit power of the engine output shaft to the transmission device input shaft.

4. The multipurpose vehicle according to claim 1, further comprising:
   a truck box provided at a rear portion of the vehicle body and capable of being swung vertically; and
   a hydraulic cylinder connected with the truck box and configured to swing the truck box,
   wherein the hydraulic valve is provided at a rear portion of the spacer housing in such a manner as to be capable of operating the hydraulic cylinder.

5. The multipurpose vehicle according to claim 1, wherein the continuously variable transmission device is a hydraulic continuously variable transmission device, and while the spacer housing is detached, an input shaft of a belt continuously variable transmission device as a replacement of the hydraulic continuously variable transmission device is connectable with the engine output shaft, and an output shaft of the belt continuously variable transmission device is connectable with the transmission input shaft.

* * * * *